(12) United States Patent
Edberg et al.

(10) Patent No.: US 6,357,699 B1
(45) Date of Patent: Mar. 19, 2002

(54) DEVICE FOR CONTROLLED RELEASE OF TENSION

(75) Inventors: Donald L. Edberg, Irvine; Michael J. Tracy, Aliso Viejo, both of CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 09/578,666

(22) Filed: May 25, 2000

(51) Int. Cl.[7] ................................. B64G 1/64
(52) U.S. Cl. .................. 244/158 R; 102/377
(58) Field of Search .............. 244/158 R, 161; 102/377, 378; 411/433; 246/173, 137.4; 294/82.26, 82.32, 82.3; 24/648; 89/1.51, 1.58, 159; 285/407; 220/321

(56) References Cited

U.S. PATENT DOCUMENTS

| | | |
|---|---|---|
| 4,715,565 A | 12/1987 | Wittmann |
| 4,719,858 A | 1/1988 | Stiles |
| 5,060,888 A | 10/1991 | Vezain et al. |
| 5,129,306 A | 7/1992 | Fauvel |
| 5,318,255 A | 6/1994 | Facciano et al. |
| 5,695,306 A * | 12/1997 | Nygren, Jr. ............ 411/433 |
| 5,743,492 A | 4/1998 | Chan et al. |
| 5,898,123 A | 4/1999 | Fritz et al. |
| 5,969,287 A | 10/1999 | Blain et al. |
| 6,119,984 A * | 9/2000 | Devine ................ 244/158 R |

* cited by examiner

*Primary Examiner*—Galen Barefoot
(74) *Attorney, Agent, or Firm*—Harness Dickey & Pierce P.L.C.

(57) ABSTRACT

A tension-relieving apparatus for reducing a level of tension in a structure. The tension-relieving apparatus includes a housing, a piston, a spacer member and a heat source. The housing has a wall member that defines a piston cavity. A rod aperture is formed in a first end of the wall member. The piston assembly has a rod and a piston. The rod extends through the rod aperture. The piston is disposed in the piston cavity and is coupled to an end of the rod. The spacer member is disposed in the piston cavity and is coupled to the piston assembly. The spacer member is transformable between a first condition and a second condition, with the first condition maintaining the piston at a first distance from the first end of the housing. The heat source is coupled to one of the housing, the piston assembly, and or the spacer member and provides heat to selectively cause the spacer member to transform to the second condition wherein the spacer member at least partially melts to permit the rod to advance toward the first end of the housing. Advancement of the piston toward the first end of the housing relieves a predetermined portion of the tension in the structure.

29 Claims, 3 Drawing Sheets

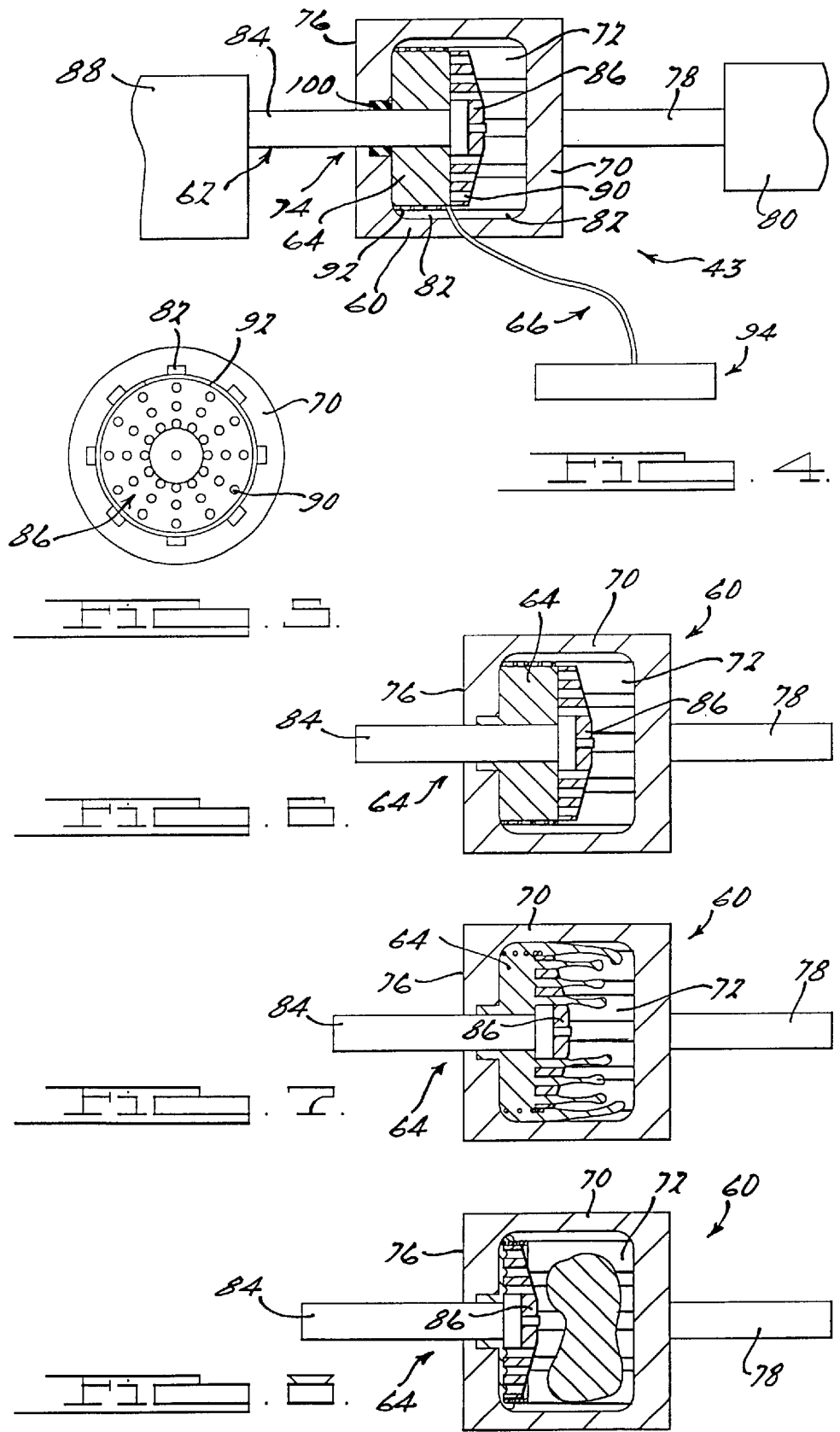

DEVICE FOR CONTROLLED RELEASE OF TENSION

TECHNICAL FIELD

The present invention relates generally to a clamping connection assembly for retaining separable component portions of an assembled launch vehicle and more particularly to a device for controllably releasing at least a portion of the tension in a clamping connection prior to the separation of the separable component portions.

BACKGROUND OF THE INVENTION DISCUSSION

Connection assemblies, such as those that retain separable parts of an assembled launch vehicle provide important structural links in the primary load path of an assembled launch vehicle during both boost and ascent flight and, if necessary, during re-entry. For example, satellites frequently jettison a portion of their structure, such as a propulsion motor during their launch. As can be readily appreciated, spacecraft connection assemblies must be designed not only for low weight, but also for extremely high reliability due to the high cost of the spacecraft launch and the general inaccessibility to rectify any errors.

Designers in this field have recognized the desirability of using tension band clamping assemblies, to hold together separable components of an assembled launch vehicle, it is also desirable to reduce the shock produced during the release of the payload so as to reduce the risk of vibrating and damaging the payload of the assembled launch vehicle.

In the 1960s, a connection assembly design referred to as the Marman and was proposed which included a plurality of V-shaped retainers or shoe members that permitted the coupling of a pair of flanges positioned on the exterior surfaces of separable component parts of the assembled launch vehicle. A separable tension band was joined together by a pair of spaced pyrotechnic tension bolts that could adjustably vary the tension in the straps that held the V-shaped retainers together. The tension straps were utilized to create inwardly radial forces on the V-shaped retainers which in turn would clamp the flanges of the cylindrical housing structures together. This V-band coupling was configured to transfer loads and bending moments across the resulting structural joint of the connection assembly.

One problem noted with this approach concerns the shock that is produced upon the sudden release of tension in the clamp band. This tension is released from the clamp band when explosive bolts or bolt cutters are used. The magnitude of the shock delivered to the payload created by the sudden release of tension from the clamp band can exceed several thousand Gs and may be the greatest shock experienced during a launch. This problem is further aggravated by the trend towards larger and heavier payloads, since such payloads generally require the use of a clamp band that can produce higher levels of tension to properly secure the payload to the launch vehicle. As the shock produced upon the sudden release of tension from the clamp band varies with the level of tension in the clamp band, the use of a higher tension clamp band increases the risk that the sensitive spacecraft instrumentation will be damaged as a result of the sudden release of tension from the clamp band.

SUMMARY OF THE INVENTION

It is one object of the present invention to provide a tension-relieving apparatus to selectively release at least a portion of the tension in a structure.

It is a further object of the present invention to provide a tension-relieving apparatus that releases tension in a structure at a controlled rate.

It is yet another object of the present invention to provide a clamping apparatus having a tensionable band member whose tension may be controllably released to reduce the shock created when the band member is separated from a pair of separable spacecraft components.

In one form, the present invention provides a tension-relieving apparatus for reducing a level of tension in a structure. The tension-relieving apparatus includes a housing, a piston, a spacer member, and a heat source. The housing has a wall member that defines a piston cavity. A rod aperture is formed in a first end of the wall member. The piston assembly has a rod and a piston. The rod extends through the rod aperture. The piston is disposed in the piston cavity and is coupled to an end of the rod. The spacer member is disposed in the piston cavity. The spacer member is transformable between a first condition and a second condition, with the first condition maintaining the piston at a first distance from the end of the housing. The heat source is coupled to the housing, the piston assembly, and the spacer member and provides heat to selectively cause the spacer member to transform to the second condition wherein the spacer member transforms to its second condition to permit the rod to advance toward the first end of the housing. Advancement of the piston toward the first end of the housing relieves a predetermined portion of the tension in the structure.

BRIEF DESCRIPTION OF THE DRAWINGS

Additional advantages and features of the present invention will become apparent from the subsequent description and the appended claims, taken in conjunction with the accompanying drawings, wherein:

FIG. 4 is a schematic cross-sectional view of the tension-relieving apparatus of FIG. 1 taken along its longitudinal centerline;

FIG. 5 is a schematic cross-sectional view of the tension-relieving apparatus of FIG. 1 taken normal to its longitudinal centerline; and FIGS. 6 through 8 are schematic illustrations similar to that of FIG. 4 but illustrating the operation of the tension-relieving apparatus.

DETAILED DESCRIPTION OF THE PREFERRED EMBODIMENTS

Figure 1:
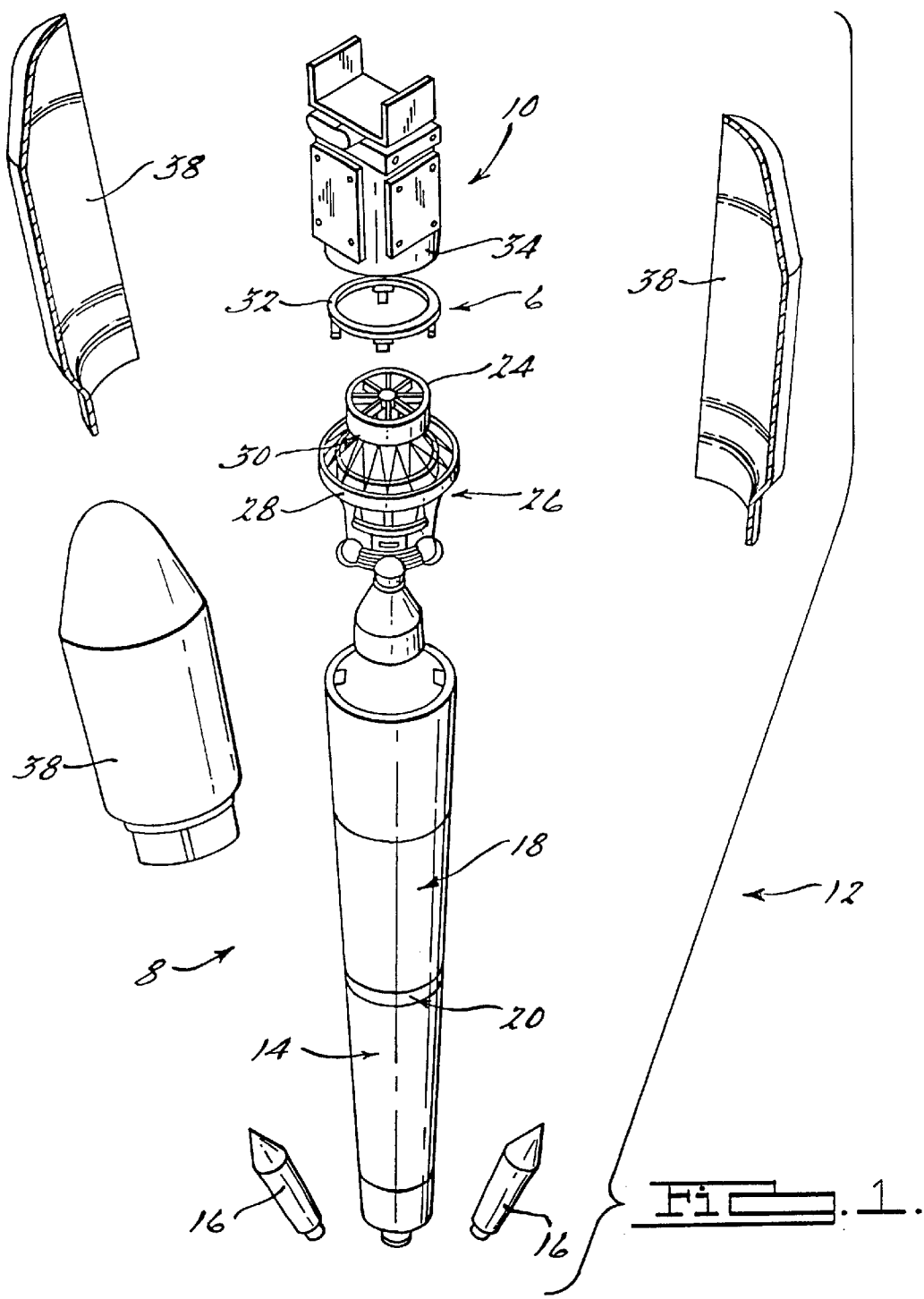
FIG. 1 is a an exploded perspective view of a launch vehicle and assembled launch vehicle constructed in accordance with the teachings of the present invention.

With reference to FIG. 1 of the drawings, a clamping apparatus constructed in accordance with the teachings of the present invention is generally indicated by reference numeral 6. Clamping apparatus 6 is shown in operative association with a launch vehicle 8 and a payload 10 to collectively form an assembled launch vehicle 12. A typical assembled launch vehicle 12 also includes a first stage oxidizer tank 14, thrust augmentation solid fuel thrusters 16, a first stage fuel tank 18, a center body section 20 and an upper stage 26.

The oxidizer tank 14 and the first stage fuel tank 18 are joined by a center body section 20. The thrust augmentation solid fuel thrusters 16 may be mounted below the first stage fuel oxidizer tank 14. The guidance electronics for the launch vehicle 8 are shown at 24 and are mounted on a second stage 26 that includes a miniskirt 28 and a payload attachment fitting 30. The clamping apparatus 6 couples the payload 10 to the second stage 26. More specifically, the clamping apparatus 6 includes a clamping structure 32 which releasably couples the payload attachment fitting 30 to a payload mount 34.

During the launch, the payload 10 is surrounded by a three-piece fairing 38 which provides a protective cone that encapsulates the payload 10 and the second stage 26 during the launch. The fairing 38 is subsequently ejected to enable the deployment of the payload 10 in a predetermined orbit.

Figure 2:
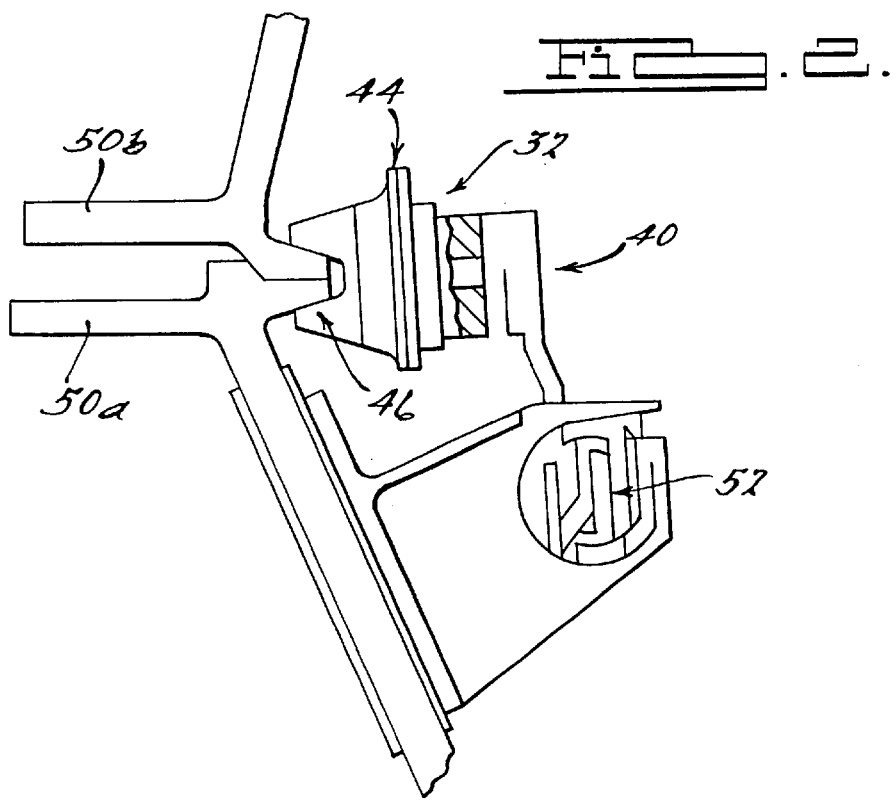
FIG. 2 is a cross-sectional view of a portion of the base of the assembled launch vehicle of FIG. 1 illustrating the interface between the clamping apparatus and the separable spacecraft components.
Figure 3:
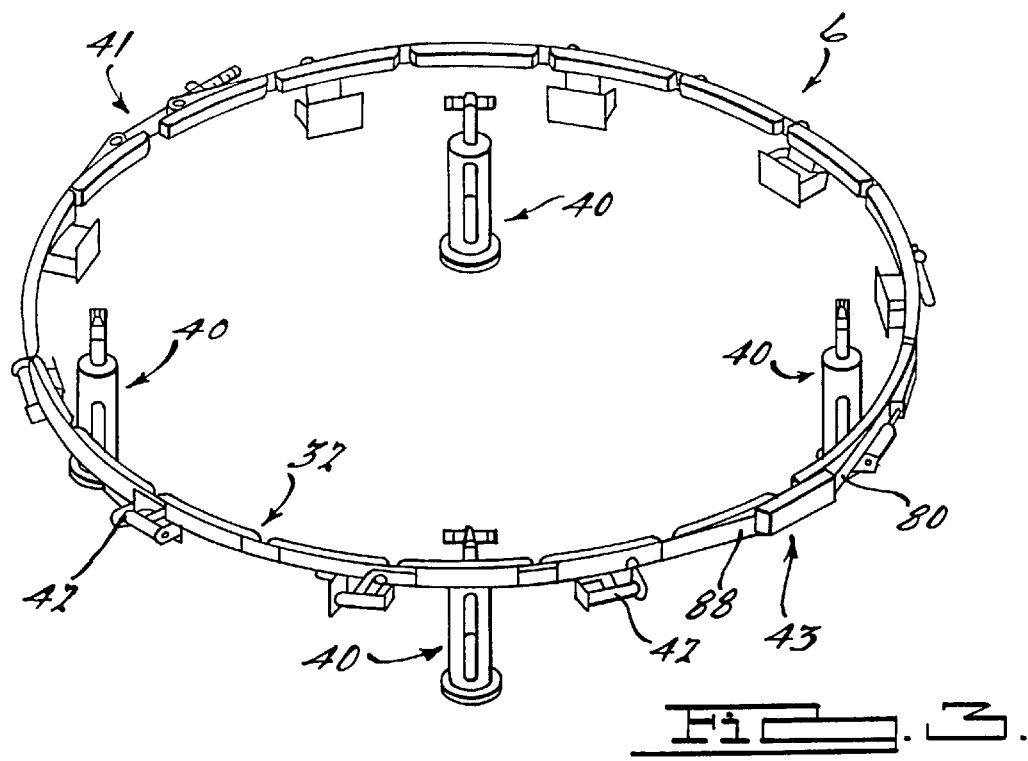
FIG. 3 is a perspective view of the clamping apparatus of FIG. 1.

In FIGS. 2 and 3, the clamping apparatus 6 is shown in greater detail. The clamping apparatus 6 is shown to include a clamping structure 32, a plurality of ejecting springs 40, a set of clamp band end fittings 41, a plurality of clamp structure retention mechanisms 42 and a tension-relieving device 43. The clamping structure 32 includes a band member 44 having a V-shaped flange interface 46 for coupling a first separable spacecraft component, such as launch vehicle 8, and a second separable spacecraft component, such as payload 10, together. This aspect of the band member 44 is known in the art and need not be discussed in detail. Briefly, tension applied through the set of clamp band end fittings 41 to band member 44 is converted into a clamping force that is transmitted through the flange interface 46 onto the flange members 50a and 50b of the launch vehicle 8 and the payload 10, respectively.

The clamp structure retention mechanism 42 is a spring-loaded device which is pivotably coupled at a first end 52 to the launch vehicle 8 and pivotably coupled at a second end 54 to the clamping structure 32. The clamp structure retention mechanism 42 exerts a radially outwardly directed force onto clamping structure 32. The radially outwardly directed force pulls the clamping structure 32 away from the flange 50b after tension has been released from the clamping structure 32 to permit the payload 10 to separate in an unencumbered manner from the launch vehicle 8.

In FIGS. 4 and 5, the tension-relieving device 43 is shown to include a housing 60, a piston assembly 62, a spacer member 64 and a heat source 66. The housing 60 has a wall member 70 which defines a generally cylindrical piston cavity 72. A rod aperture 74 is formed into a first end 76 of the housing 60. A bolt 78 couples the housing 60 to a first end 80 of the clamping structure 32. A plurality of grooves 82 may be formed into the perimeter of the piston cavity 72 but recent testing has tended to show that these are not necessary.

The piston assembly 62 includes a rod 84 and a piston 86. The rod 84 extends through the rod aperture 74. The piston 86 is disposed within the piston cavity 72 and is coupled to an end of the rod 84. A distal end of the rod 84 is coupled to a second end 88 of the clamping structure 32. The piston 86 may also include a plurality of holes 90 which extend through the piston 86 along an axis parallel to the longitudinal axis of the rod 84. Recent testing has also shown that these are also not necessary.

The spacer member 64 is disposed within the piston cavity 72 and is captured by the piston assembly 62. In the particular embodiment illustrated, the spacer member 64 is a hollow cylinder or thick washer which is disposed around the rod 84 and is interposed between the piston 86 and the first end 76 of the housing 60. The spacer member 64 is transformable between a first condition to maintain the piston 86 at a predetermined minimum distance from the first end 76 of the housing 60, and a second condition which permits the piston 86 to advance toward the first end 76 of the housing 60. Preferably, the spacer member 64 is formed from a material having a low melting point, such as a fusible alloy, and has a melting point of about 100° F. to about 150° F. One such material is CERROLOW-117 manufactured by Cerro Corporation.

The heat source 66 may be coupled to the housing 60, the piston assembly 62 or the spacer member 64. The heat source 66 is selectively actuatable to provide heat to cause the spacer member 64 to transform to the second condition wherein the spacer member 64 at least partially deforms (e.g., melts, becomes more ductile, softens). The heat source 66 preferably includes a heater element 92 for producing heat which is in direct contact with the spacer member 64. In the particular embodiment illustrated, the heater element 92 is formed from a Ni-Chrome wire, the heat source 66 is powered by a battery power source 94 and the amount of heat generated by heat source 66 is sufficient to melt spacer member 64. Those skilled in the art will understand that the heat source 66 may also or alternatively include a chemical or explosive charge to produce heat.

FIGS. 6 through 8 illustrate the operation of the tension-relieving device 43. With additional reference to FIG. 2, the clamping apparatus 6 is positioned relative to the launch vehicle 8 and the payload 10 such that the V-shaped flange interface 46 of the band member 44 engages the flanges 50a and 50b of the launch vehicle 8 and the payload 10, respectively. Tension applied to the clamping structure 32 to retain the launch vehicle 8 and the payload 10 together is transmitted from the first end 80 of the clamping structure 32 through the tension-relieving device 43 and into the second end 88 of the clamping structure 32. Within the tension-relieving device 43, tension applied to the housing 60 is transmitted through the spacer member 64 and into the piston assembly 62. As shown in FIG. 6, the spacer member 64 maintains the piston 86 at a predetermined distance from the first end of the housing 60.

Upon the actuation of the heat source 66, the spacer member 64 transforms to the second condition wherein the spacer member 64 at least partially melts. In this regard, the spacer member 64 may become very ductile or it may convert to a molten state which permits the rod 84 to advance toward the first end 76 of the housing 60, as illustrated in FIGS. 7 and 8, to relieve at least a portion of the tension in the clamping apparatus 6. The advancement of the piston 86 elongates the overall length of the clamping apparatus 6 (i.e., the overall length of the clamping structure 32 and tension relieving device 43 as measured between the clamp band end fittings 41) to relieve at least a portion of the tension in the clamping structure 32. As those skilled in the art will readily understand, the amount of tension released by the tension-relieving device 43 is dependent upon the initial length of the spacer member 64 (i.e., the length of the spacer member 64 in the first condition).

The rate with which the piston 86 is permitted to advance toward the first end 76 of the housing 60 may be controlled by factors such as the clearance between the housing 60 and the piston 86, the size of the plurality of holes 90 in the piston 86, the size of the grooves 82 in the piston cavity 72, the amount of tension that has been applied to the clamping apparatus 6 and the degree to which the spacer member 64 melts.

In the particular embodiment illustrated, advancement of the piston assembly is partially controlled at a predetermined advancement rate through the plurality of holes 90 formed the piston 86, the plurality of grooves 82 formed in the piston cavity 72 and the amount of clearance between the piston 86 and the piston cavity 72. The plurality of holes 90, the plurality of grooves 82 and the amount of clearance between the piston 86 and the piston cavity 72 are sized to permit the melted material from which spacer member 64 is formed to flow through and around the piston 86 at a predetermined flow rate. A seal member, such as O-ring 100, is disposed between the rod 84 and the rod aperture 74 in this embodiment to prevent any of the material which has melted from flowing out of the housing 60.

After the tension in the clamping structure 32 has been relieved, exploding bolts or bolt cutters may be employed to sever the clamping structure 32 to release any remaining tension. As it is possible for the tension-relieving device 43 to substantially reduce the tension in the clamping structure 32, the shock produced by severing the clamping structure 32 may be significantly attenuated to reduce the risk that the severing of the clamp structure will damage the payload 10. Thereafter, the clamp structure retention mechanism 42 exerts a radially outwardly directed force onto clamping structure 32 to pull the clamping structure 32 away from the payload 10 and permit the payload 10 to separate in an unencumbered manner from the launch vehicle 8.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the foregoing description and the appended claims.

What is claimed is:

1. A tension-relieving apparatus for reducing a level of tension in a structure, the tension-relieving apparatus comprising:

a housing having a wall member defining a piston cavity, a rod aperture being formed in a first end of the wall member, the housing adapted to be coupled to a first end of the structure;

a piston assembly having a rod and a piston, the rod extending through the rod aperture, the piston disposed in the piston cavity and coupled to an end of the rod, a distal end of the rod adapted to be coupled to a second end of the structure;

a spacer member disposed in the piston cavity between the piston and the housing, the rod extending through a central aperture formed in the spacer member, the spacer member being transformable between a first condition and a second condition, the spacer member being operable in the first condition for maintaining the piston at a first distance from the first end of the housing; and a heat source coupled to one of the housing, the piston assembly and the spacer member, the heat source providing heat to selectively cause the spacer member to transform to the second condition wherein the spacer member at least partially melts to permit the rod to advance toward the first end of the housing;

wherein advancement of the piston toward the first end of the housing is adapted to relieve at least a portion of the tension in the structure.

2. The tension-relieving apparatus of claim 1, wherein the spacer member is formed from a material having a low melting point.

3. The tension-relieving apparatus of claim 2, wherein the material is a fusible alloy.

4. The tension-relieving apparatus of claim 3, wherein the fusible alloy has a melting point of about 100° F. to about 150° F.

5. The tension-relieving apparatus of claim 2, wherein advancement of the piston assembly is at least partially controlled at predetermined advancement rate by a plurality of holes formed into the piston, the plurality of holes sized to permit any of the material which has melted to flow through the piston at a predetermined flow rate.

6. The tension-relieving apparatus of claim 2, wherein advancement of the piston assembly is at least partially controlled at a predetermined advancement rate by a plurality of grooves formed into the piston cavity, the plurality of grooves sized to permit any of the material which has melted to flow through the plurality of grooves between the piston and the wall member at a predetermined flow rate.

7. The tension-relieving apparatus of claim 2, further comprising a seal member disposed between the rod and the rod aperture, the seal member preventing any of the material which has melted from flowing out of the housing.

8. The tension-relieving apparatus of claim 1, wherein the heat source includes a heater element for producing heat, the heater element being in contact with the spacer member.

9. The tension-relieving apparatus of claim 8, wherein the heating element is formed from a Ni-Chrome wire.

10. The tension-relieving apparatus of claim 8, wherein the heat source further includes a battery power source.

11. The tension-relieving apparatus of claim 1, wherein the heat source includes at least one of an explosive charge and a chemical charge for producing heat.

12. A tension-relieving apparatus for reducing a level of tension in a structure, the tension-relieving apparatus comprising:

a housing having a wall member defining a piston cavity, a rod aperture being formed in a first end of the wall member, the housing adapted to be coupled to a first end of the structure;

a piston assembly having a rod and a piston, the rod extending through the rod aperture, the piston disposed in the piston cavity and coupled to an end of the rod, a distal end of the rod adapted to be coupled to a second end of the structure;

a spacer member formed from a material having a low melting point, the spacer member disposed in the piston cavity between the piston and the housing, the rod extending through a central aperture formed in the spacer member, the spacer member being transformable between a first condition and a second condition, the spacer member being operable in the first condition for maintaining the piston at a first distance from the first end of the housing; and a heat source coupled to one of the housing, the piston assembly and the spacer member, the heat source providing heat to selectively cause the spacer member to transform to the second condition wherein the spacer member transforms to permit the rod to advance toward the first end of the housing at a predetermined advancement rate;

wherein advancement of the piston toward the first end of the housing is adapted to relieve at least a portion of the tension in the structure.

13. The tension-relieving apparatus of claim 12, wherein the material is a fusible alloy.

14. The tension-relieving apparatus of claim 13, wherein the fusible alloy has a melting point of about 100° F. to about 150° F.

15. The tension-relieving apparatus of claim 12, wherein the heat source deforms the spacer member by melting it.

16. A clamping apparatus for coupling a pair of separable spacecraft components, the clamping apparatus comprising:
   a clamp structure having a tensionable band member adapted for exerting a clamping force to retain the pair of separable spacecraft components together; and
   a tension-relieving apparatus coupled to the clamp structure, the tension-relieving apparatus including a housing, a piston assembly, a spacer member and a heat source, the housing having a wall member defining a piston cavity, a rod aperture being formed in a first end of the wall member, the housing coupled to a first end of the clamp structure, the piston assembly having a rod and a piston, the rod extending through the rod aperture, the piston disposed in the piston cavity and coupled to an end of the rod, a distal end of the rod coupled to a second end of the structure, the spacer member disposed in the piston cavity and coupled to the piston assembly, the spacer member being transformable between a first condition and a second condition, the spacer member being operable in the first condition for transmitting the clamping force from the piston to the housing and maintaining the piston at a first distance from the first end of the housing, the heat source coupled to one of the housing, the piston assembly and the spacer member, the heat source providing heat to selectively cause the spacer member to transform to the second condition wherein the spacer member deforms to permit the rod to advance toward the first end of the housing;
   wherein advancement of the piston toward the first end of the housing elongates an overall length of the clamping apparatus to relieve at least a portion of the tension in the clamp structure.

17. The clamping apparatus of claim 16, wherein the spacer member is formed from a material having a low melting point.

18. The clamping apparatus of claim 17, wherein the material is a fusible alloy.

19. The clamping apparatus of claim 18, wherein the fusible alloy has a melting point of about 100° F. to about 150° F.

20. The clamping apparatus of claim 17, wherein the heat source deforms the spacer member by melting it and the advancement of the piston assembly is at least partially controlled at predetermined advancement rate by a plurality of holes formed into the piston, the plurality of holes sized to permit any of the material which has melted to flow through the piston at a predetermined flow rate.

21. The clamping apparatus of claim 17, wherein the heat source deforms the spacer member by melting it and the advancement of the piston assembly is at least partially controlled at a predetermined advancement rate by a plurality of grooves formed into the piston cavity, the plurality of grooves sized to permit any of the material which has melted to flow through the plurality of grooves between the piston and the wall member at a predetermined flow rate.

22. The clamping apparatus of claim 16, further comprising a seal member disposed between the rod and the rod aperture, the heat source deforming the spacer member by melting it and the seal member preventing any of the material which has melted from flowing out of the housing.

23. The clamping apparatus of claim 16, wherein the heat source includes a heater element for producing heat, the heater element being in contact with the spacer member.

24. The clamping apparatus of claim 23, wherein the heating element is formed from a Ni-Chrome wire.

25. The clamping apparatus of claim 23, wherein the heat source further includes a battery power source.

26. The clamping apparatus of claim 16, wherein the spacer member includes a central aperture through which the rod is disposed.

27. A tension-relieving apparatus for reducing a level of tension in a structure, the tension-relieving apparatus comprising:
   a housing defining a piston cavity, a first end of the housing being adapted to coupled to a first end of the structure;
   a piston assembly at least partially disposed in the piston cavity, the piston assembly having a rod adapted to be secured to a second end of the structure; and
   a transformable spacer member disposed within the piston cavity, the rod extending through a central aperture formed in the spacer member, the spacer member being operable for maintaining the piston at a predetermined position within the piston cavity when the spacer member is in a first, unheated condition, and for allowing the piston assembly to move to a position wherein tension is relieved between the first and second ends of the structure when the spacer member is caused to be heated.

28. The tension-relieving apparatus of claim 27, wherein the spacer member is susceptible to being at least partially melted; and
   wherein the piston assembly includes a plurality of openings allowing a melted portion of the spacer member to flow therethrough, thus allowing the thickness of the spacer member to be controllably reduced.

29. The tension-relieving apparatus of claim 27, further comprising a heater assembly in electrical communication with the spacer member for controllably heating the spacer member to cause controlled melting thereof.

* * * * *